(12) United States Patent
Mouret et al.

(10) Patent No.: US 12,704,769 B2
(45) Date of Patent: Aug. 11, 2026

(54) CAMERA SUPPORT SYSTEM HAVING LOCKABLE DAMPERS

(71) Applicant: LEADSONLINE, LLC

(72) Inventors: Nicolas Mouret, Verdun (CA); Serge Labrecque, Laval (CA)

(73) Assignee: LEADSONLINE, LLC, Plano, TX (US)

( * ) Notice: Subject to any disclaimer, the term of this patent is extended or adjusted under 35 U.S.C. 154(b) by 183 days.

(21) Appl. No.: 18/699,067

(22) PCT Filed: Oct. 18, 2022

(86) PCT No.: PCT/CA2022/051531
§ 371 (c)(1),
(2) Date: Apr. 5, 2024

(87) PCT Pub. No.: WO2023/065020
PCT Pub. Date: Apr. 27, 2023

(65) Prior Publication Data
US 2025/0231467 A1 Jul. 17, 2025

Related U.S. Application Data

(60) Provisional application No. 63/256,696, filed on Oct. 18, 2021.

(51) Int. Cl.
*G03B 17/56* (2021.01)
*F16M 11/20* (2006.01)

(52) U.S. Cl.
CPC .......... *G03B 17/561* (2013.01); *F16M 11/20* (2013.01); *F16M 2200/02* (2013.01)

(58) Field of Classification Search
CPC ... G03B 17/561; F16M 11/20; F16M 2200/02
See application file for complete search history.

(56) References Cited

U.S. PATENT DOCUMENTS 5,153,633 A 10/1992 Otani
7,658,555 B1 2/2010 Moilanen
(Continued)

FOREIGN PATENT DOCUMENTS

CN 207162036 U 3/2018
CN 207555103 U 6/2018
CN 209856741 U 12/2019

*Primary Examiner* — Minh Q Phan

(57) ABSTRACT

A camera support system for a high-definition camera, comprising: a base; a camera support disposed over the base; at least one damper operatively connected to the base and to the camera support and operable to dampen movements between the camera support and the base; a locking system operable to lock the camera support in relationship to the base, the locking system having a first member mounted to the base and a second member mounted to the camera support, the first member movable relative to the second member, the first member and the second member matingly engageable to one another, the locking system having a locked configuration in which the first member is engaged to the second member and in which movements of the camera support are blocked, and an unlocked configuration in which the first member is disengaged from the second member and in which the camera support is movable.

18 Claims, 6 Drawing Sheets

(56) References Cited

U.S. PATENT DOCUMENTS

| | | | | |
|---|---|---|---|---|
| 8,790,023 | B2 | 7/2014 | Yamada | |
| 9,127,744 | B2 | 9/2015 | Chapman | |
| 10,557,518 | B2 | 2/2020 | Tomomasa | |
| 2012/0235014 | A1 | 9/2012 | Li | |
| 2012/0251091 | A1* | 10/2012 | Mameda | H04N 1/00562 396/428 |
| 2014/0105589 | A1 | 4/2014 | Samuels | |
| 2020/0096782 | A1 | 3/2020 | Miller et al. | |

* cited by examiner

Damp relative movements of the camera support relative to the base when the camera is powered — 702

Lock the camera support to the base to prevent relative movements of the camera support relative to the base when the camera is unpowered — 704

CAMERA SUPPORT SYSTEM HAVING LOCKABLE DAMPERS

CROSS-REFERENCE TO RELATED APPLICATIONS

This application claims benefit from U.S. provisional application No. 63/256,696 filed on Oct. 18, 2022.

TECHNICAL FIELD

This disclosure generally relates to the field of high definition cameras and, more specifically, to damping systems used to stabilize these high definition cameras while capturing images.

BACKGROUND

Optical systems including cameras and microscopes are typically supported by dampers. These dampers are used to isolate the cameras from vibrations from the environment to avoid those vibrations from affecting the quality of images captured by the cameras. These dampers are very sensitive and may be damaged when subjected to excessive forces. Hence, improvements are sought.

SUMMARY

In one aspect, there is provided a camera support system for a high-definition camera, comprising: a base; a camera support disposed over the base for supporting the high-definition camera; at least one damper operatively connected to the base and to the camera support, the at least one damper operable to dampen movements between the camera support and the base; and a locking system operable to lock the camera support in relationship to the base, the locking system having a first member mounted to the base and a second member mounted to the camera support, the first member movable relative to the second member, the first member and the second member matingly engageable to one another, the locking system having a locked configuration in which the first member is engaged to the second member and in which movements of the camera support relative to the base are blocked by the first member and the second member, and an unlocked configuration in which the first member is disengaged from the second member and in which the camera support is movable relative to the base via the at least one damper.

The camera support may include any of the following features, in any combinations.

In some embodiments, an actuator is mounted to one of the base and the camera support, the actuator operable to move the first member relative to the second member from a first position corresponding to the locked configuration to a second position corresponding to the unlocked configuration.

In some embodiments, the actuator is mounted to the base and engaged to the first member.

In some embodiments, a biasing member is mounted to one of the base and the camera support, the biasing member operable to move the first member relative to the second member toward the first position corresponding to the locked configuration, the actuator operable to counteract a moment generated by the biasing member.

In some embodiments, locking system is in the locked configuration when the actuator is unpowered.

In some embodiments, one of the first member and the second member is movable whereas the other of the first member and the second member is fixed, the biasing member engaged to the one of the first member and the second member.

In some embodiments, the biasing member is mounted to the base and engaged to the first member.

In some embodiments, the camera support includes a magnet and a magnetically-attractable plate, one of the magnet and the magnetically-attractable plate mounted to the one of the first member and the second member, the other of the magnet and the magnetically-attractable plate mounted to a corresponding one of the base and the camera support, the magnet magnetically connected to the magnetically-attractable plate in the second position.

In some embodiments, the first member includes at least one first hook and the second member includes at least one second hook.

In some embodiments, the at least one first hook is rotatably mounted to the base and the at least one second hook is fixed to the camera support.

In some embodiments, the first member includes a plurality of first hooks and the second member includes a plurality of second hooks, each of the plurality of first hooks matingly engageable to a respective one of the plurality of second hooks.

In some embodiments, the plurality of first hooks are defined by arms of a cross-shaped member, the cross-shaped member rotatably mounted to the base.

In some embodiments, the plurality of second hooks are secured to the camera support, the cross-shaped member rotatable between a first position corresponding to the locked configuration and in which each of the plurality of first hooks is engaged to a respective one of the plurality of second hooks, and a second position corresponding to the unlocked configuration and in which the plurality of first hooks are disengaged from the plurality of second hooks.

In some embodiments, an actuator is engaged to the cross-shaped member, the actuator operable to rotate the cross-shaped member from the first position to the second position.

In some embodiments, a biasing member is engaged to the cross-shaped member and exerting a force on the cross-shaped member to bias the cross-shaped member in the first position corresponding to the locked configuration of the locking system, the actuator operable to counteract a moment generated by the biasing member on the cross-shaped member.

In some embodiments, a magnet is secured to one of the cross-shaped member and the base and a magnetically-attractable plate secured to the other of the cross-shaped member and the base, the magnet magnetically connected to the magnetically-attractable plate in the second position of the cross-shaped member.

In another aspect, there is provided a method of operating a camera support system having a camera support for supporting a camera, the camera support mounted to a base via dampers, the method comprising: damping relative movements of the camera support relative to the base when the camera is powered; and locking the camera support to the base to prevent relative movements of the camera support relative to the base when the camera is unpowered.

The method may include any of the following features, in any combinations.

In some embodiments, the locking of the camera support to the base includes engaging a first member mounted to the base to a second member mounted to the camera support.

In some embodiments, the engaging of the first member to the second member includes moving at least one first hook in relationship to the base until the at least one first hook is engaged to at least one second hook secured to the camera support.

In some embodiments, the moving of the at least one first hook includes moving the at least one first hook with a biasing member engaged to the base and to the at least one first hook.

Many further features and combinations thereof concerning the present improvements will appear to those skilled in the art following a reading of the instant disclosure.

DETAILED DESCRIPTION

Figure 1:
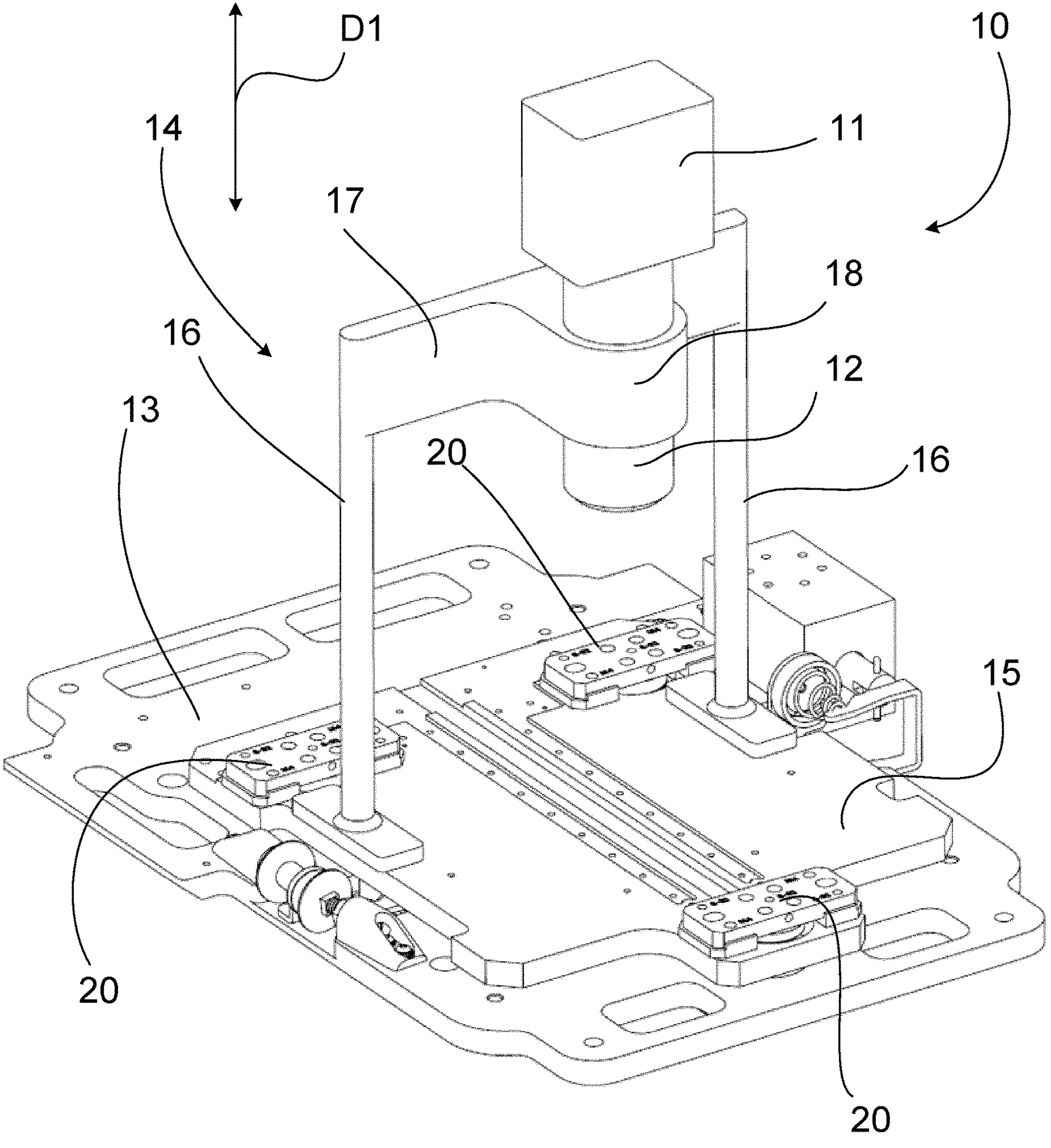
FIG. 1 is a three dimensional view of a camera support system in accordance with one embodiment.

Referring to FIG. 1, a camera support system is shown at 10 and is used to support a camera 11 and a microscope 12 mounted to the camera 11. The microscope 12 may be a high definition lens able to magnify an object captured by the camera. The camera support system 10 includes a base 13 and a camera support 14 mounted over the base 13. The base 13 may be laid on a table or any other support during use. The camera support 14 is movable relative to the base 13 along a first direction D1 being normal to the base 13 and within a plane being normal to the direction D1. The first direction D1 may be a vertical direction. The camera support 14 includes a plate 15, two vertical members 16 protruding generally vertically from the plate 15 and a horizontal member 17 connected to distal ends of both of the two vertical members 16. The camera support 14 may include only one or more than two vertical members 16 in some embodiments. The horizontal member 17 may define a bracket 18 for receiving the microscope 12. It will be appreciated that the camera support 14 may have a different configuration without departing from the scope of the present disclosure. For instance, more or less than two vertical members 16 may be used. The camera 11 and/or microscope 12 may be mounted to the camera support 14 via any suitable means.

Figure 2:
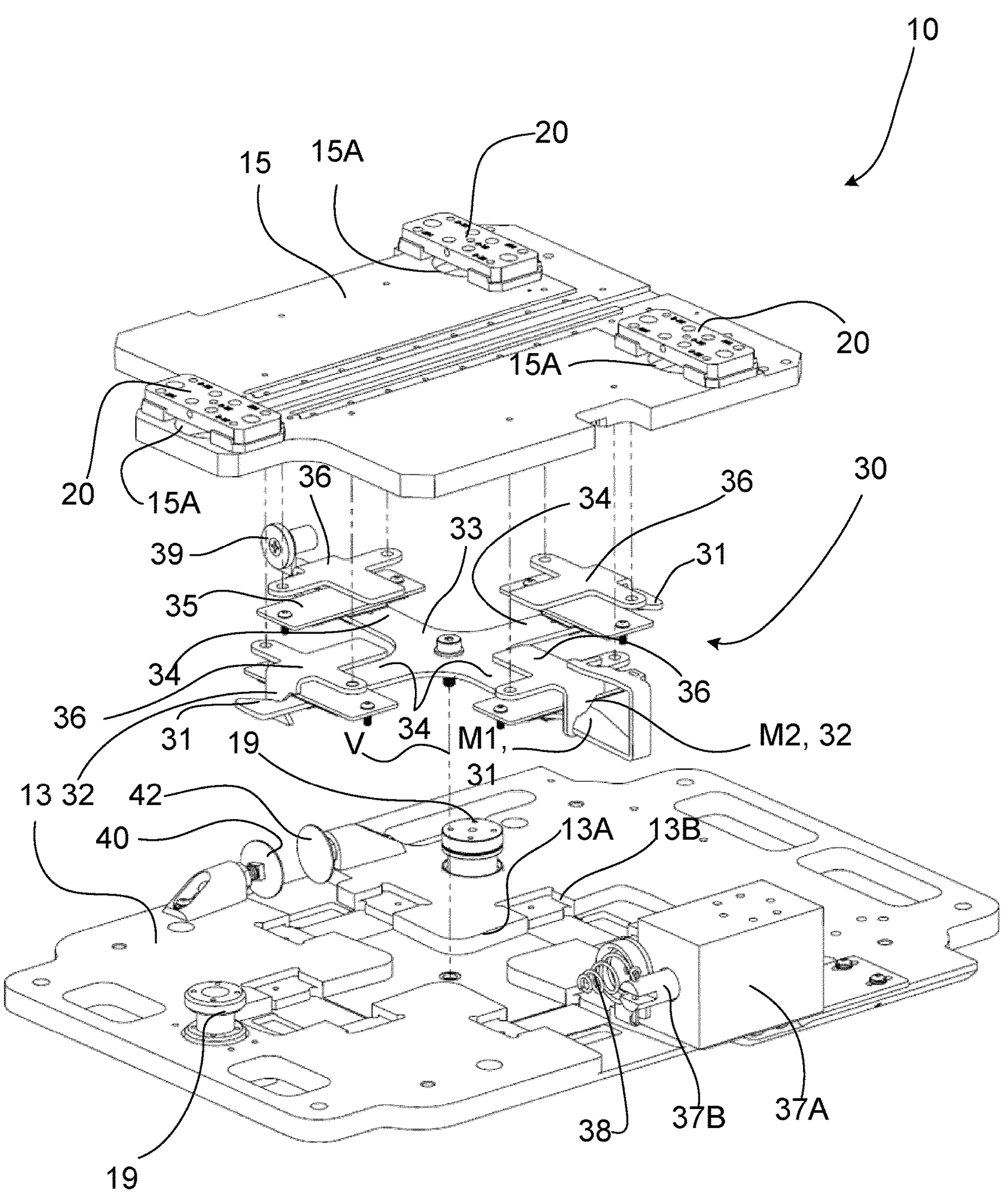
FIG. 2 is a three dimensional partially exploded view of the camera support system of FIG. 1.
Figures 3, 4:
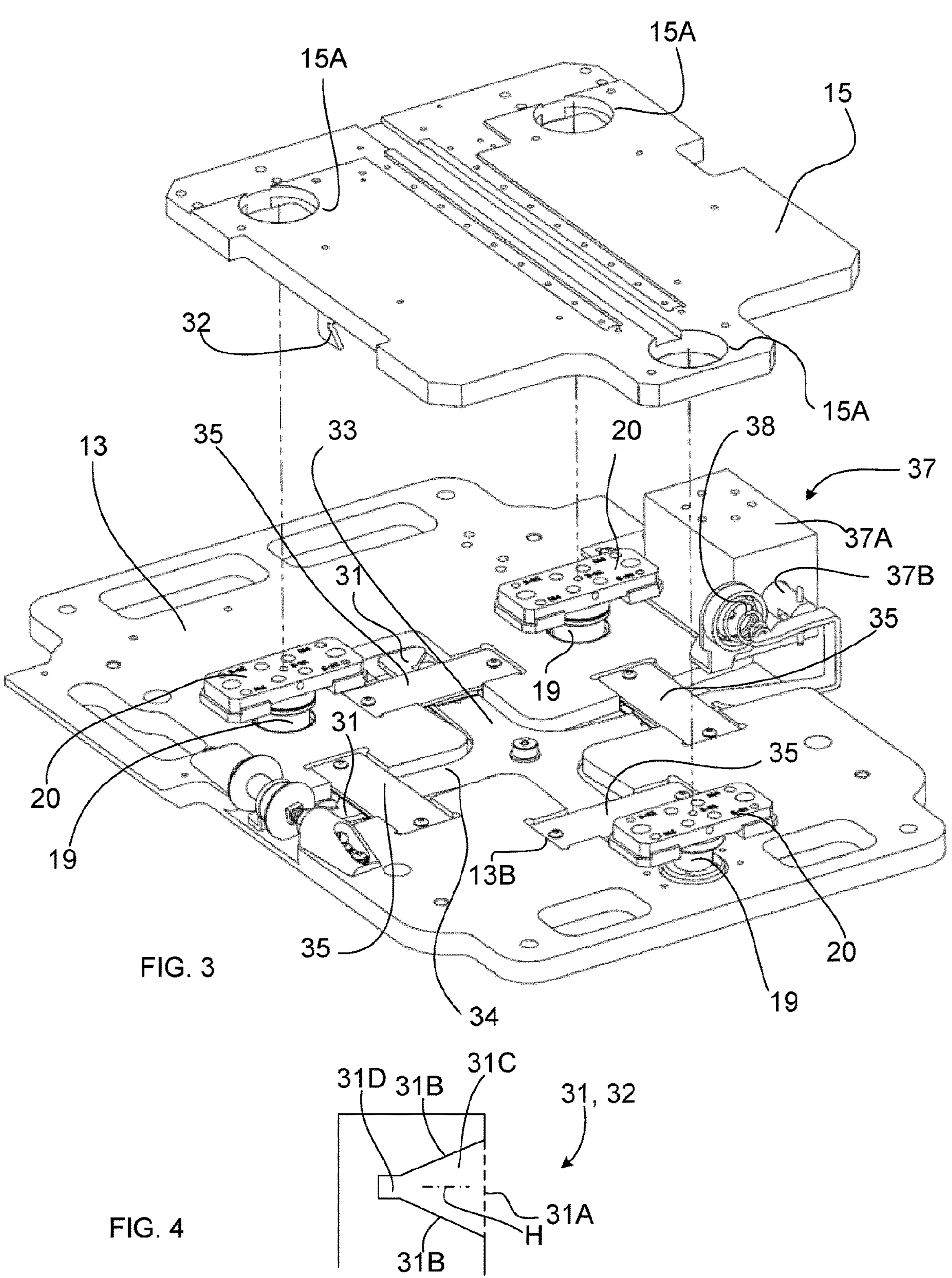
FIG. 3 is another three dimensional partially exploded view of the camera support system of FIG. 1.
FIG. 4 is a schematic plan view of a hook for the camera support system of FIG. 1.

Referring to FIGS. 2-3, the camera support system 10 includes dampers, three dampers 19 in the depicted embodiment although any suitable number of dampers 19 is contemplated. The dampers 19 may be compressed along the direction D1 and may allow translation within the plane normal to the direction D1. Hence, the camera support 14 may be movable relative to the base 13 in translation along three axes normal to one another and in rotation about each of these three axes. The camera support 14 may therefore be secured to the base 13 solely via the dampers 19. The dampers 19 permit movements of the camera support 14 relative to the base 13 along a vertical axis V, which is parallel to the first direction D1, and within the plane normal to the vertical axis V. In use, the camera support system 10 may be laid on a table for instance. Vibrations may propagate from the table to the base 13. The dampers 19 are used to limit those vibrations from propagating to the camera support 14 since this may impair the quality of the images being captured by the camera 11. More specifically, the camera 11 and microscope 12 may be used to photograph very small details, for instance, marks imparted on a bullet and/or a shell by a firearm. Slight vibrations of the camera support 14, and thus of the camera 11, may prevent the captured image from being used to analyse those marks.

The dampers 19 are operatively connected to both of the base 13 and the camera support 14. Herein, the dampers 19 have first ends secured to the base 13 and second opposed ends secured to the plate 15 of the camera support 14 via brackets 20 (FIG. 3). More specifically, the plate 15 may define apertures 15A. These apertures 15A may alternatively be any opening, open or closed, extending through the plate 15. The brackets 20 may be secured to the plate 15 and overlap the apertures 15A. Each of the dampers 19 extends through a respective one of the apertures 15A and is secured to a respective one of the brackets 20. Other configurations are contemplated. For instance, the dampers may have first ends secured to a top face of the base 13 and second ends secured to a bottom face of the plate 15. The brackets 20 may be fastened to the plate 15 or secured to the plate 15 via any suitable means (e.g., welding, fasteners, etc). In some cases, the brackets 20 may be omitted. The brackets 20 may be monolithic with the plate 15.

In some embodiments, the camera support system 10 may be transported between different locations. In some cases, the camera support system 10 is to be used inside a vehicle of a forensic team. The dampers 19 may be configured to dampen small vibrations and may be damaged if subjected to forces and accelerations beyond certain thresholds. These thresholds may be trespassed when the vehicle in which the camera support system is stored is moving. In other words, bumps on a road on which the vehicle is rolling may damage the dampers 19.

Referring more particularly to FIG. 2, in the embodiment shown, the camera support system 10 includes a locking system 30 that is operable to selectively lock the camera support 14 in relationship to the base 13. The locking system 30 includes a first member M1 movably mounted to the base 13 and a second member M2 mounted to the camera support 14. Alternatively, the first member M1 may be movably mounted to the camera support 14 whereas the second member M2 is mounted to the base 13. The first member M1 and the second member M2 are matingly engageable to one another. The locking system 30 has a locked configuration in which the first member M1 is engaged to the second member M2 and in which movements of the camera support 14 relative to the base 13 and along the first direction D1 normal to the base 13 and within the plane normal to the first direction D1 are blocked by the first member M1 and the second member M2, and an unlocked configuration in which the first member M1 is disengaged from the second member M2 and in which the camera support 14 is movable relative to the base 13 along the first direction D1 and within the plane.

In the embodiment shown, the first member M1 includes at least one first hook, four first hooks 31 in the depicted embodiment, and the second member M2 includes at least one second hook, four second hooks 32 in the depicted embodiment. The first hooks 31 are engageable to the second hooks 32. Once the first hooks 31 are engaged to the second hooks 32, they become axially locked to one another relative to the vertical axis V. In the embodiment shown, once the first hooks 31 are engaged to the second hooks 32, their relative translation in the plane normal to the vertical axis V is blocked. It will be appreciated that any suitable number of hooks may be used without departing from the scope of the present disclosure.

Figures 5A, 5B:
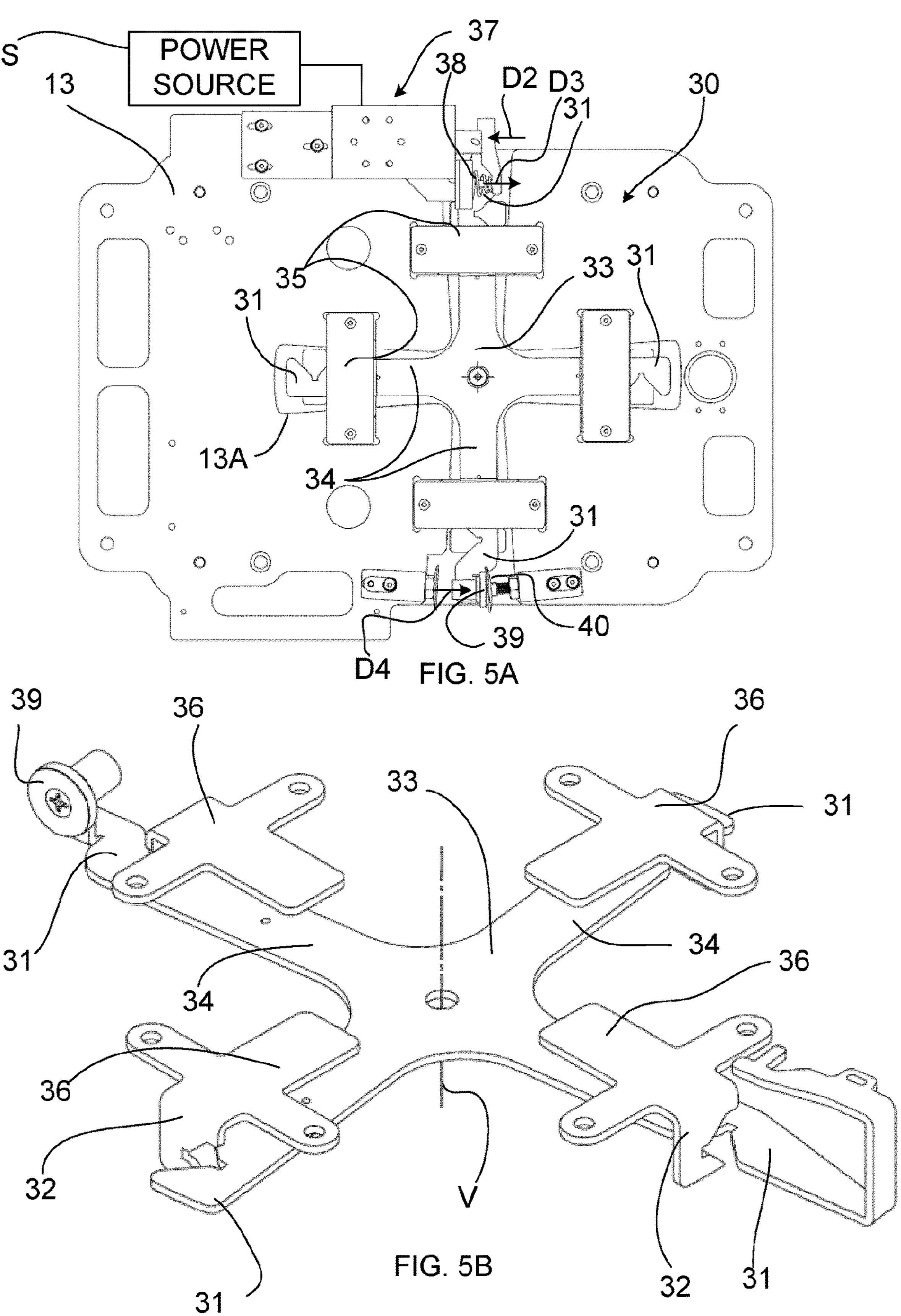
FIG. 5A is a top view of a portion of the camera support system illustrated in an unlocked configuration.
FIG. 5B is a three dimensional view of locking members of the camera support system illustrated in the unlocked configuration.

In the present embodiment, the first hooks 31 are disposed at ends of a cross-shaped member 33 that includes four arms 34. Each of the first hooks 31 is defined at a distal end of a respective one of the four arms 34. The cross-shaped member 33 is pivotally mounted to the base 13 and is rotatable relative to the base 13 about the vertical axis V. Thus, when the first hooks 31 are engaged to the second hooks 32, rotation of the cross-shaped member 33 about the vertical axis V is limited by the second hooks 32. The cross-shaped member 33 may be received within a recess 13A defined by the base 13; the recess 13A extending from a top face of the base 13 toward a bottom face of the base 13. The recess 13A may have a cross-shape substantially corresponding to a shape of the cross-shaped member 33. However, as shown in FIG. 5A, a footprint of the recess 13A is greater than that of the cross-shaped member 33 to allow movements of the cross-shaped member 33 within the recess 13A and relative to the base 13 about the vertical axis V. Other shapes of the recess 13A are contemplated, for instance, the recess may be cylindrically shaped. In some embodiments, the recess 13A may be omitted and the cross-shaped member 33 may be disposed atop the base 13. The cross-shaped member 33 may be replaced by any suitable device able to be pivotably mounted to the base 13 and defining the one or more first hooks 31.

As shown in FIG. 3, the cross-shaped member 33 may be locked within the recess 13A by four locking plates 35. The locking plates 35 may be fastened to the base 13 to sandwich the arms 34 of the cross-shaped member 33 between the base 13 and the locking plates 35. In the embodiment shown, the locking plates 35 are each received within a respective plate-receiving recess 13B defined by the base 13. The locking plates 35 and the base 13 cooperate to prevent vertical movements of the arms 34 along the vertical axis V. In other words, movements of the cross-shaped member 33 and of the arms 34 may be constrained to a rotation about the vertical axis V by at least the locking plates 35. The locking plates 35 may therefore prevent bending of the arms 34, which would otherwise allow movements of the camera support 14 relative to the base 13, which is undesired in the locked configuration of the locking system 30. In an alternate embodiment, the cross-shaped member may be made of a material having suitable stiffness to avoid the use of the locking plates, which may thus be omitted.

Referring to FIGS. 2-3, the second hooks 32 are secured to a bottom face of the plate 15 of the camera support 14 and protrude downwardly along the vertical axis V toward the base 13. The second hooks 32 are non-movable relative to the plate 15. The second hooks 32 may be defined by L-shaped plates 36, four in the embodiment shown, secured to the bottom face of the plate 15. The second hooks 32 may be substantially perpendicular to the first hooks 31. In some embodiments, the second hooks 32 may be monolithic with the plate 15 of the camera support 14. Each of the second hooks 32 is in register with a respective one of the first hooks 31 such that rotation of the cross-shaped member 33 engages the first hooks 31 within the second hooks 32 as will be explained further below. In an alternate embodiments, the cross-shaped member 33 may be pivotably mounted to the plate 15 while the second hooks 32 may be fixed to the base 13.

Referring to FIG. 4, a shape of the first hooks 31 is described below. The description below may also apply to the second hooks 32. The first hook 31 includes an opening 31A defined by side walls 31B. The side walls 31B define a guiding section 31C of the first hook 31 and converge toward one another along a hook axis H and lead to an end section 31D in which the side walls 31B are substantially parallel to one another. In use, when the first hooks 31 and the second hooks 32 move toward one another along the hook axis H, the side walls 31B may become in contact with the second hooks 32 to guide the second hooks 32 along the guiding section 31C until the second hooks 32 are at least partially received within the end section 31D. At which point, the first and second hooks 31, 32 become locked to one another thereby preventing both vertical movements relative to the vertical axis V and translational movements within the plane normal to the vertical axis V. Any suitable shapes of the hooks is contemplated without departing from the scope of the present disclosure. In the present embodiment, the first and second hooks 31, 32 have substantially the same shape and become vertically locked to one another until the first hooks 31 are received within the end sections of the second hooks 32 and when the second hooks 32 are received within the end sections 31D of the first hooks 31. This creates a locking engagement between the first hooks 31 and the second hooks 32.

Referring back to FIG. 3, the locking system 30 includes an actuator 37 that may be mounted to the base 13. It may alternatively be mounted to the plate 15 in an alternate embodiment. The actuator 37 is operable to move the first member M1 relative to the second member M2 from a first position corresponding to the locked configuration to a second position corresponding to the unlocked configuration. In the present embodiment, the actuator 37 is mounted to the base 13 and engaged to the first member M1. The actuator 37 may be a solenoid or any other suitable actuator such as a pneumatic actuator, a hydraulic actuator, and so on. The actuator 37 includes a housing 37A secured to the base 13 and a member 37B movable relative to the housing 37A. The member 37B is engaged to the cross-shaped member 33. The actuator 37 may therefore rotate the cross-shaped member 33 about the vertical axis V via longitudinal movements of the member 37B relative to the housing 37A of the actuator 37. In other words, the actuator 37 is operable to exert a moment of force on the cross-shaped member 33.

In the embodiment shown, a biasing member 38 may be mounted to one of the base 13 and the camera support 14. The biasing member 38 is engaged to a movable one of the first member M1 and the second member M2. The biasing member 38 is operable to move the first member M1 relative to the second member M2 toward the first position corresponding to the locked configuration. The biasing member 38 may be a spring. In the embodiment shown, the biasing member 38 is secured to the base 13 and engaged to the cross-shaped member 33. The actuator 37 is operable to counteract a moment generated by the biasing member 38. The biasing member 38 exerts a force on the cross-shaped member 33 that translates into a moment about the vertical axis V. The biasing member 38 therefore biases the cross-shaped member 33 into the locked configuration in which the first hooks 31 are engaged to the second hooks 32 and in which the camera support 14 is substantially immobile relative to the base 13 to protect the dampers 19. Hence, in the locked configuration, rotation of the cross-shaped member 33 about the vertical axis V is prevented in one direction by the second hooks 32 and in the other direction by the biasing member 38.

Referring now to FIGS. 5A-5B, the locking system 30 is shown in the unlocked configuration. In the unlocked configuration, the actuator 37 is powered with a power source S and exerts a force on one of the first hooks 31 of the cross-shaped member 33 along a second direction D2 thereby compressing the biasing member 38 and overcoming a force exerted by the biasing member 38 along a third direction D3 on the cross-shaped member 33. The third direction D3 is parallel, but opposite to, the second direction D2. Then, the cross-shaped member 33 is in an unlocked position, which corresponds to the unlocked configuration of the locking system 30, in which the first hooks 31 become disengaged from the second hooks 32 as illustrated in FIG. 5B.

To minimize a power consumption of the actuator 37, a magnet 39 and a magnetically-attractable plate 40 are used. One of the magnet 39 and the magnetically-attractable plate 40 is mounted to the one of the first member M1 and the second member M2. The other of the magnet 39 and the magnetically-attractable plate 40 is mounted to a corresponding one of the base 13 and the camera support 14. The magnet 39 is magnetically connected to the magnetically-attractable plate 40 in the second position corresponding to the unlocked configuration. The magnet 39 may be a permanent magnet.

In the embodiment shown, the magnet 39 is secured to one of the arms 34 of the cross-shaped member 33 and may be magnetically connected to the magnetically-attractable plate 40 secured to the base 13. In another embodiment, the magnet 39 may be secured to the base 13 while the magnetically-attractable plate 40 may be secured to the one of the arms 34 of the cross-shaped member 33. As shown in FIG. 5A, in the unlocked configuration of the locking system 30, the magnet 39 is in contact with and magnetically connected to the magnetically-attractable plate 40. This generates a force on the cross-shaped member 33 along a fourth direction D4, which translates into a moment on the cross-shaped member 33 about the vertical axis V and that cooperates with the actuator 37 in overcoming the force generated by the biasing member 38 along the third direction D3 to maintain the locking system 30 in the unlocked configuration. In other words, the magnetic force exerted by the magnet 39 is compounded by a force generated by the actuator 37 in creating a moment about the vertical axis V. In FIG. 5A, this moment is in a counter clockwise direction. This moment may be in a clockwise direction in another embodiment. This moment is used to maintain the cross-shaped member 33 in the unlocked configuration. In some configurations, this magnet 39 and magnetically-attractable plate 40 may be omitted.

Figures 6A, 6B:
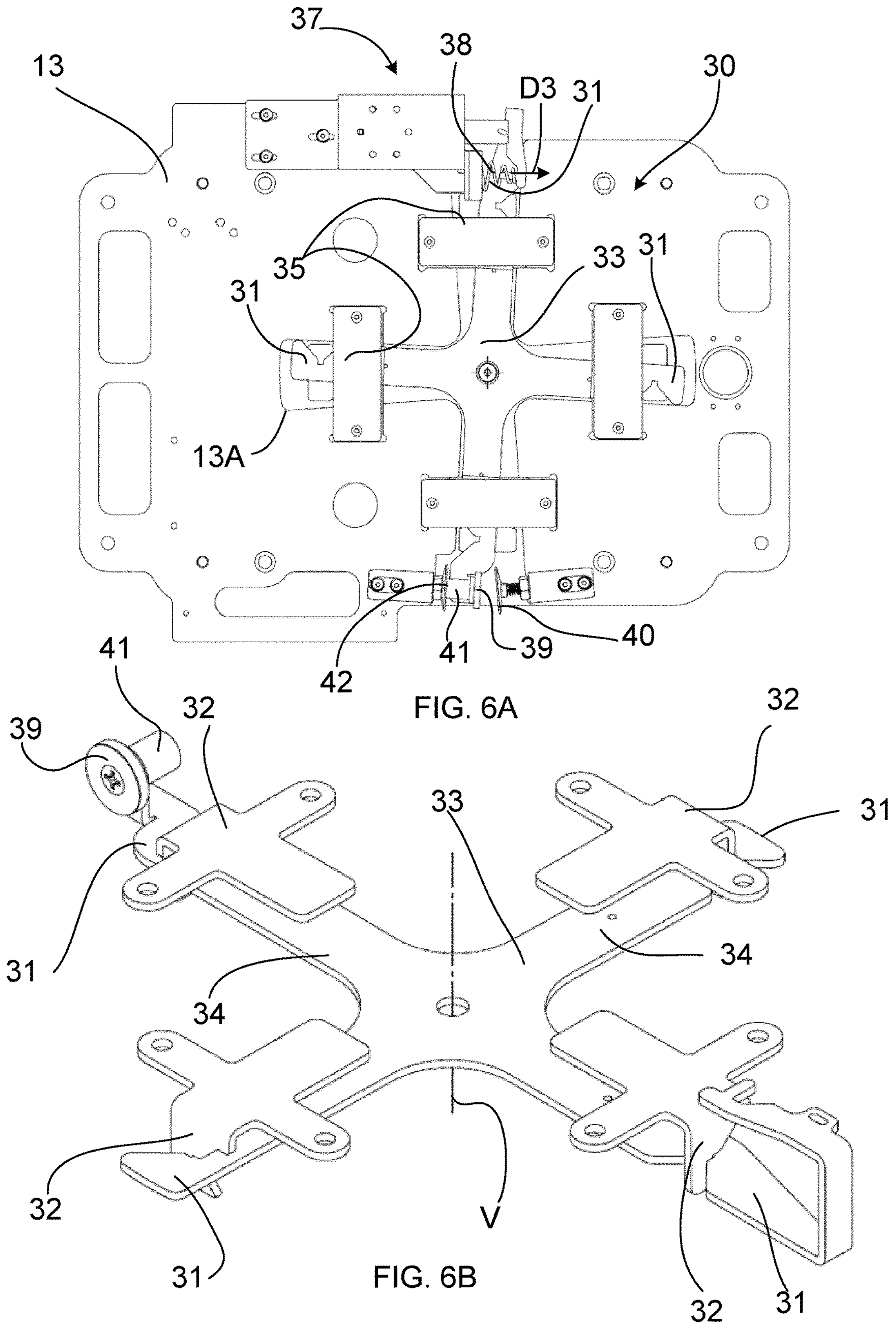
FIG. 6A is a top view of the portion of the camera support system illustrated in a locked configuration.
FIG. 6B is a three dimensional view of the locking members of the camera support system illustrated in the locked configuration.

Referring now to FIGS. 6A-6B, the locking system 30 is shown in the locked configuration. In the locked configuration, the actuator 37 is powered off thereby allowing the biasing member 38 to push the cross-shaped member 33 along the third direction D3 to engage the first hooks 31 to the second hooks 32. This is done here by rotating the cross-shaped member 33 about the vertical axis V. In the embodiment shown, this rotation is in a clockwise direction. In another embodiment, the rotation may be in a counter clockwise direction.

In the present embodiment, a moment generated by the biasing member 38 on the cross-shaped member 33 is greater than a moment generated by the magnetic force between the magnet 39 and the magnetically-attractable plate 40 on the cross-shaped member 33. Hence, when the actuator 37 is powered off, the biasing member 38 overcomes the magnetic force generated by the magnet 39 on the magnetically-attractable plate 40 and rotates the cross-shaped member 33 into a locked position, which corresponds to the locked configuration of the locking system 30, until the first hooks 31 are engaged and locked to the second hooks 32 as depicted in FIG. 6B. Stated differently, the locking system 10 is in the locked configuration when the actuator 37 is unpowered. A stopper 41 may be secured to one of the arms 34 of the cross-shaped member 33 and may abut a stopping plate 42 secured to the base 13 when the cross-shaped member 33 is rotated in the locked configuration. Hence, an amplitude of a rotational movement of the cross-shaped member 33 about the vertical axis V may be constrained by the magnetically-attractable plate 40 and the stopping plate 42. In some configurations, the stopper 41 and stopping plate 42 are omitted.

Consequently, in the embodiment shown, a default or at rest position of the locking system 30 may correspond to the locked configuration depicted in FIGS. 5A-5B. Power may have to be supplied to the actuator 37 to unlock the locking system 30 and to disengage the hooks 31, 32 from each other. Hence, when the camera support system 10 is unplugged or disconnected from any power source for transportation, the biasing member 38 will automatically rotate the cross-shaped member 33 until each of the first hooks 31 is engaged to a respective one of the second hooks 32. Therefore, no supplemental action has to be taken by personnel to lock the locking system 30 in order to protect the dampers 19. The locking of the locking system 30 occurs automatically and simultaneously once the camera support system 10 is disconnected from a power source. In some embodiments, a switch may be turned off to disconnect the camera support system 10 from the power source. This has the effect of both turning off the camera 11 and locking the locking system 30 to protect the dampers 19. Moreover, because each of the first hooks 31 is secured to the cross-shaped member 33, only a single actuator may be used to simultaneously engage each of the first hooks 31 to a respective one the second hooks 32.

In alternate embodiments, the cross-shaped member 33 may be mounted to the plate 15 instead of the base 13. It will be appreciated that the locking members, which herein corresponds to hooks, may be replaced by any suitable locking means, such as, for instance, dog and slot, tongue and groove, keyway engagement, latch, and so on. In some embodiments, more than one actuators may be used and each of the locking member may be individually actuated. The cross-shaped member 33 may include more or less than four arms 34. Each of the arms 34/second hooks 32 may be independently movable from one another and each engaged to a respective actuator. The first and second hooks may be replaced by pins and holes, or any suitable means able to block movements as described above.

Figure 7:
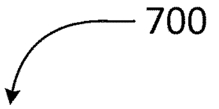
FIG. 7 is a flowchart illustrating steps of operating the camera support system of FIG. 1.

Referring now to FIG. 7, a method of operating the camera support system 10 is shown at 700. The method 700 includes damping relative movements of the camera support 14 relative to the base 13 when the camera 11 is powered at 702; and locking the camera support 14 to the base 13 to prevent relative movements of the camera support 14 relative to the base 13 when the camera 11 is unpowered at 704.

In the present embodiment, the locking of the camera support 14 to the base 13 at 704 includes engaging the first member M1 mounted to the base 13 to the second member M2 mounted to the camera support 14. The engaging of the first member M1 to the second member M2 may include moving the first hooks 31 in relationship to the base 13 until the first hooks are engaged to the second hooks 32 secured to the camera support 14. The moving of the first hooks may include moving the first hooks 31 with the biasing member 38 engaged to the base 13 and the first hooks 31. The method 700 may including powering the actuator 37 to unlock the base 13 from the camera support 14. The method 700 may include disconnecting the actuator 37 from the power source S thereby allowing the biasing member 38 to bias the first hooks 31 in engagement with the second hooks 32.

As can be seen therefore, the examples described above and illustrated are intended to be exemplary only. The scope is indicated by the appended claims.

What is claimed is:

1. A camera support system for a high-definition camera, comprising:

- a base;
- a camera support disposed over the base for supporting the high-definition camera;
- at least one damper operatively connected to the base and to the camera support, the at least one damper operable to dampen movements between the camera support and the base; and
- a locking system operable to lock the camera support in relationship to the base, the locking system having a first member mounted to the base and a second member mounted to the camera support, the first member movable relative to the second member, the first member and the second member matingly engageable to one another, the locking system having
- a locked configuration in which the first member is engaged to the second member and in which movements of the camera support relative to the base are blocked by the first member and the second member, and
- an unlocked configuration in which the first member is disengaged from the second member and in which the camera support is movable relative to the base via the at least one damper.

2. The camera support of claim 1, comprising an actuator mounted to one of the base and the camera support, the actuator operable to move the first member relative to the second member from a first position corresponding to the locked configuration to a second position corresponding to the unlocked configuration.

3. The camera support of claim 2, wherein the actuator is mounted to the base and engaged to the first member.

4. The camera support of claim 2, comprising a biasing member mounted to one of the base and the camera support, the biasing member operable to move the first member relative to the second member toward the first position corresponding to the locked configuration, the actuator operable to counteract a moment generated by the biasing member.

5. The camera support of claim 4, wherein locking system is in the locked configuration when the actuator is unpowered.

6. The camera support of claim 4, wherein one of the first member and the second member is movable whereas the other of the first member and the second member is fixed, the biasing member engaged to the one of the first member and the second member.

7. The camera support of claim 6, wherein the biasing member is mounted to the base and engaged to the first member.

8. The camera support of claim 6, comprising a magnet and a magnetically-attractable plate, one of the magnet and the magnetically-attractable plate mounted to the one of the first member and the second member, the other of the magnet and the magnetically-attractable plate mounted to a corresponding one of the base and the camera support, the magnet magnetically connected to the magnetically-attractable plate in the second position.

9. The camera support system of claim 1, wherein the first member includes at least one first hook and the second member includes at least one second hook.

10. The camera support of claim 9, wherein the at least one first hook is rotatably mounted to the base and the at least one second hook is fixed to the camera support.

11. The camera support of claim 1, wherein the first member includes a plurality of first hooks and the second member includes a plurality of second hooks, each of the plurality of first hooks matingly engageable to a respective one of the plurality of second hooks.

12. The camera support of claim 11, wherein the plurality of first hooks are defined by arms of a cross-shaped member, the cross-shaped member rotatably mounted to the base.

13. The camera support of claim 12, wherein the plurality of second hooks are secured to the camera support, the cross-shaped member rotatable between a first position corresponding to the locked configuration and in which each of the plurality of first hooks is engaged to a respective one of the plurality of second hooks, and a second position corresponding to the unlocked configuration and in which the plurality of first hooks are disengaged from the plurality of second hooks.

14. The camera support of claim 13, comprising an actuator engaged to the cross-shaped member, the actuator operable to rotate the cross-shaped member from the first position to the second position.

15. The camera support of claim 14, comprising a biasing member engaged to the cross-shaped member and exerting a force on the cross-shaped member to bias the cross-shaped member in the first position corresponding to the locked configuration of the locking system, the actuator operable to counteract a moment generated by the biasing member on the cross-shaped member.

16. The camera support of claim 15, comprising a magnet secured to one of the cross-shaped member and the base and a magnetically-attractable plate secured to the other of the cross-shaped member and the base, the magnet magnetically connected to the magnetically-attractable plate in the second position of the cross-shaped member.

17. A method of operating a camera support system having a camera support for supporting a camera, the camera support mounted to a base via dampers, the method comprising:

- damping relative movements of the camera support relative to the base when the camera is powered; and
- locking the camera support to the base to prevent relative movements of the camera support relative to the base when the camera is unpowered;
- wherein the locking of the camera support to the base includes engaging a first member mounted to the base to a second member mounted to the camera support;

wherein the engaging of the first member to the second member includes moving at least one first hook in relationship to the base until the at least one first hook is engaged to at least one second hook secured to the camera support.

18. The method of claim 17, wherein the moving of the at least one first hook includes moving the at least one first hook with a biasing member engaged to the base and to the at least one first hook.

* * * * *